Patented Sept. 5, 1950

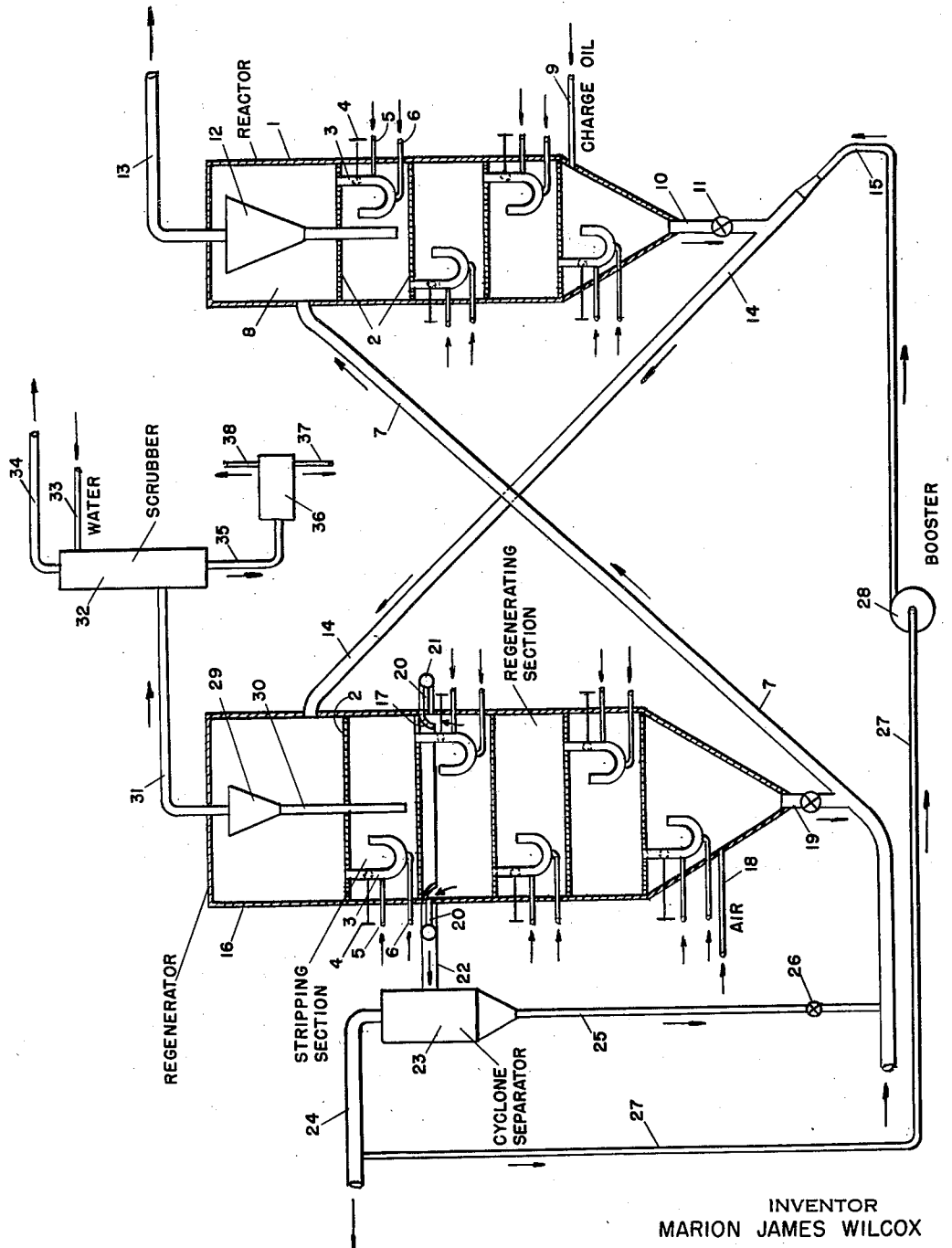

2,520,983

UNITED STATES PATENT OFFICE 2,520,983

FLUIDIZED STRIPPING AND REGENERATION OF SPENT HYDROCARBON CONVERSION CATALYST

Marion J. Wilcox, Harvey, Ill., assignor to Sinclair Refining Company, New York, N. Y., a corporation of Maine Application April 30, 1947, Serial No. 745,040

2 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst, at elevated temperature, is suspended in oil vapors, passed to a reactor in which conversion of the oil occurs, and in which the spent catalyst is separated from the oil vapors, the separated catalyst stripped of oil, regenerated by decarbonization and the regenerated catalyst again suspended in the stream of oil vapors passing to the reactor. Operations of the type described are commonly designated fluid catalyst processes.

An important consideration in operations of this type is the subjection of the hydrocarbon vapors to be converted to uniform reaction conditions. To effect uniform reaction, it is not only necessary that the hydrocarbon vapors be brought into intimate and uniform contact with the catalyst, but it is also necessary that the catalyst be of uniform activity.

The difficulty in attaining uniformity of reaction has been aggravated by what is commonly designated top-to-bottom mixing in the contact zones. There is in the regenerator, for instance, a large amount of catalyst, some of which is spent catalyst just returned from the reaction zone, other is partially regenerated catalyst and, still other, is completed regenerated catalyst ready for return to the reaction zone. In practical operation, according to conventional procedure, there is also usually present in the regenerator an appreciable proportion of catalyst which has remained too long in the regenerating zone and has, thereby, lost some of its catalytic activity by overburning, for instance.

Because of the mixing commonly occurring in the regenerating zone, the catalyst withdrawn therefrom and passed to the reaction zone, normally contains an appreciable proportion of particles of catalyst which have not been completely regenerated as well as particles of catalysts of lower activity, because of over-burning.

A similar condition normally exists in the reactor. Because of so-called top-to-bottom mixing, some of the catalyst withdrawn for regeneration is only partially spent while other has remained in the reaction zone for a period in excess of its useful catalytic activity.

Also, a somewhat similar condition normally exists in the stripping zone, a portion of the catalyst being passed to the regenerating zone before it has been adequately stripped of absorbed hydrocarbons.

In my copending application Serial No. 745,034 filed concurrently herewith, I have described and claimed an improved method and apparatus whereby objectionable mixing of the catalyst in the respective zones is largely overcome and more uniform contacting between the particles of catalyst and the vapors, or gases, in the regenerator, stripper and reactor, respectively, is attained with the resultant improved conversion efficiency.

The present invention provides further improvements in fluid catalyst processes by utilization of the contacting methods described in said copending application and in which the stripping zone and the regenerating zone are combined in a single chamber, while avoiding objectionable mixing of the unstripped catalyst with the catalyst undergoing regeneration.

In conventional practice, the spent catalyst from the reaction zone has been stripped of hydrocarbons by passing the catalyst from the reaction zone downwardly through a stripping column, usually extending downwardly from the lower end of the reactor, and in which the spent catalyst is stripped by blowing with steam, the steam and stripped hydrocarbons passing upwardly into the reactor. It has been recognized that the passage of steam into the reactor deleteriously affects the activity and life of the catalyst and also reduces the capacity of the reactor.

In an effort to mitigate these conditions, it has been proposed to convey the spent catalyst from the bottom of the reactor, in a current of steam, to a stripping zone entirely separate from the reaction zone and from which steam is not permitted to enter the reactor. However, the deleterious effect of steam on the catalyst has not been entirely overcome by these methods. Further, large quantities of steam have been necessary to effect the conveying and stripping of the catalyst.

In accordance with the present invention, the use of steam, and also the necessity of supplying a separate stripping chamber, may be completely avoided.

These and other desirable ends are accomplished in accordance with my present invention, by combining the stripping zone and regenerating zone in a single chamber, the spent catalyst being passed directly from the reaction chamber to an upper zone of a combined stripping and regenerating chamber, in the lower part of which the catalyst is regenerated by burning with air, or other oxidizing gases, and from which lower zone the hot products of combustion pass upwardly through the incoming spent catalyst in the stripping zone.

In conventional regenerating methods, the passage of spent catalyst directly from the reactor to the regenerator has not been feasible because of the turbulent condition of the dense phase bed of catalyst in the regenerator which would result in the mixing of the unstripped catalyst with catalyst undergoing regeneration, as previously noted, and the burning of valuable hydrocarbons. However, by employing the contacting methods described in my said copending application, the stripping of the catalyst in an upper zone, or zones, of the regenerating chamber may be advantageously effected.

In accordance with my said copending application, objectionable mixing of the catalyst in the respective contact zones is largely, if not completely avoided, and more uniform contact between the particles of catalyst and the vapors, or gases, in the respective zones is attained, by passing the gaseous medium upwardly through a plurality of bodies of relatively dense fluidized catalyst flowing in alternate directions transversely to the gaseous stream and from an upper to a lower bed, generally concurrently to the direction of flow of the gaseous stream, as more fully hereinafter described and illustrated.

In accordance with my present invention, this method of contacting is utilized by passing the spent, unstripped catalyst withdrawn from the reaction zone into the uppermost zone of a combined stripping and regenerating chamber, such as described, and causing it to flow back and forth through progressively lower zones of the chamber while passing regenerating air upwardly through the bodies of catalyst in the lower portion of the chamber. Upon contact of the air with the hot catalyst, carbonaceous deposits thereon are burned-off and the hot products of combustion, or at least a portion thereof, are caused to continue upwardly through the upper zones of the chamber in contact with the incoming spent catalyst, thus stripping vaporizable hydrocarbons therefrom.

The catalyst passes generally downwardly through the chamber first generally countercurrent to hot products of combustion and finally to the rising air. As the air passes upwardly through the chamber, the oxygen thereof is consumed by combustion of the carbonaceous material on the catalyst, so that the fresh air is first contacted with catalyst which had been substantially freed of carbonaceous deposit and, as it continues upwardly through the chamber, comes in contact with the catalyst progressively richer in combustible matter.

The amount of air passed to the bottom of the reaction zone, and the passage of the catalyst downwardly through the zone, are, with advantage, so regulated that the oxygen of the air is substantially completely consumed before it reaches the upper zones of the chamber wherein stripping is effected. In this way, the hot gas passing in contact with the unstripped catalyst entering the chamber from the reaction zone is substantially oxygen-free and effects the stripping of hydrocarbons from the catalyst without substantial oxidation of the hydrocarbons.

The invention provides an improved process adapted to continuous operation and comprising a plurality of cooperating steps so coordinated as to constitute a unitary operation in which a charge of catalyst is repeatedly used, intermittently regenerated, and returned to the reaction zone, and in which the catalyst is stripped of hydrocarbons, prior to regeneration, in the upper portion of the zone of regeneration by contact with hot products of combustion from the regenerating step.

The invention is applicable to various fluid catalyst processes in which spent catalyst is stripped of hydrocarbons and regenerated by burning, as will appear more fully from the following description of the invention as applied to a fluid catalyst cracking operation with reference to the accompanying drawing which represents conventionally and somewhat diagrammatically, a flow diagram of a fluid catalyst cracking operation embodying my invention.

Referring to the particular embodiment of the invention illustrated by the drawings, the apparatus indicated by reference numeral 1, represents a generally cylindrical reactor divided into a plurality of zones by perforated plates 2.

Extending downwardly from opposite sides of alternate plates are J-tubes 3 each provided with a valve arrangement 4, adapted to regulate the flow of catalyst downwardly therethrough, and with lines 5 and 6 adapted to the injection of a gaseous medium into the J-tubes to maintain the catalyst therein in fluid condition and to assist its downward passage through the J-tubes.

The gaseous medium injected at 5 and 6 is, with advantage, a light hydrocarbon or a mixture of light hydrocarbons, but other gaseous media may be used, for instance, hydrogen gas, depending upon the particular reaction being effected.

The valves represented in the drawings at 4 are ordinary butterfly valves, but other suitable valves, of conventional type, for instance, slide valves, may be used for this purpose.

The catalyst suspended in a conveying medium, for instance, a light hydrocarbon gas, or vapor, is passed to the reactor through conduit 7 entering an upper zone 8 of the reactor. By reason of the diminished velocity of the suspension entering through line 7, the catalyst tends to drop out of suspension forming a relatively dense phase body of catalyst on the uppermost plate 2.

Preheated charge oil is introduced into the lower zone of the reactor through line 9 and passes upwardly through the perforations in the transverse plates 2, and the relative dense phase bodies of catalyst on the respective plates, thus coming into intimate contact with the catalyst and maintaining the catalyst in a fluidized condition. By reason of the upward passage of the vapors through the perforations in the transverse plates, the catalyst is not permitted to flow downwardly therethrough but flows horizontally across the plates 2 and gravitates downwardly through J-tubes 3 into the next lower zone of the reactor and forms a relatively dense phase fluidized body of catalyst on the next lower plate. Some of the catalyst may be carried from a lower to a higher zone by the rising vapors but it is for the most part, at least, reprecipitated in the next higher zone and mixing of spent catalyst with active catalyst is minimized. Thus, the charge oil is repeatedly brought into intimate and uniform contact with catalyst of progressively higher activity.

The amount of catalyst passing downwardly through the respective J-tubes 3 is so regulated by means of valves 4 that the catalyst reaches the lower zone of the reactor by the time it has become spent. The spent catalyst is withdrawn from the reactor through spent catalyst leg 10 in which there is interposed a valve 11 of conventional type.

The hydrocarbon vapors pass from the upper portion of the reactor through cyclone type separator 12 for the separation of suspended catalyst and passed therefrom through line 13 to fractionating apparatus, not shown. The catalyst separated from the effluent vapors is dropped back into the reactor, advantageously to an intermediate or lower zone.

The spent catalyst flowing from leg 10 into conduit 14 is caught up by a stream of gases, or vapors, advantageously products of combustion from the regenerating zone, introduced through line 15, and is carried up into an upper stripping section of the regenerator 16.

The regenerator shown in the drawings is a vertically elongated cylindrical chamber, generally similar to reactor 1, divided into an upper stripping section and a lower regenerating section by baffles 17, each section being provided with J-tube trays such as described with reference to the reaction chamber.

The spent catalyst containing hydrocarbons enters the upper section of the regenerator and flows downwardly therethrough substantially as described with reference to the reactor. Air, or other oxidizing gas, is introduced into the lower zone of the regenerating section through line 18 and passes upwardly therethrough generally countercurrent to the downwardly moving catalyst.

Corresponding parts of the regenerator are substantially identical with those of the reactor previously described and are indicated by like reference numerals.

The spent catalyst entering the upper zone of the regenerator forms a relatively dense phase fluidized bed on the uppermost plate 2, flows across the plate and gravitates into the next lower zone through J-tube 3 forming a body of fluidized catalyst on the next lower tray. The downward passage of catalyst through the J-tube is so controlled by valve 4 that the catalyst is fully stripped of vaporizable hydrocarbons upon leaving the lower zone of the stripping section by the hot products of combustion passing upwardly therethrough.

The stripped catalyst proceeds from the stripping section downwardly through the regenerating section, in the manner described, its flow therethrough being so regulated by the valves 4 that carbonaceous deposits are substantially completely burned therefrom upon reaching the lower zone of the regenerating section, and it is withdrawn therefrom through regenerated catalyst leg 19 into the lower end of conduit 7 where it is caught up by a stream of gaseous medium and returned therewith to the reactor, as previously described.

A portion of gaseous products of combustion passing upwardly from the regenerating section may be withdrawn from the upper zone of the regenerating section at a point or points beneath the baffles 17, advantageously through a plurality of connections 20 leading into bustle pipe 21, and it passes therefrom through conduit 22 to cyclone type separator 23, for the separation of suspended catalyst. Gaseous products of combustion pass from the separator through conduit 24 to a precipitator or stack, not shown, and separated catalyst passes from the separator through leg 25 into the lower end of conduit 7 where it is picked up by the gaseous medium passing therethrough and carried, together with catalyst withdrawn from the lower portion of the regenerator, into the reactor. The flow of the catalyst through leg 25 is controlled by valve 26.

In the operation shown in the drawings, the gaseous medium used for conveying the catalyst from the reactor to the regenerator is flue gases and for this purpose a portion of the flue gases passing through conduit 24 may be by-passed through conduit 27 to booster 28 and forced through line 15 into the lower end of conduit 14. It will be understood, however, that other conveying gaseous media may be used for this purpose.

The products of combustion passing upwardly through the stripping section from the regenerator, together with hydrocarbons stripped from the catalyst, pass from the upper portion of the regenerator through cyclone separator 29, for the removal of suspended catalyst, the latter being returned, advantageously, to an intermediate, or lower, zone of the regenerator through return line 30. The gases, and vapors, pass from the separator through line 31 to scrubber 32.

In the scrubber, the products of combustion admixed with hydrocarbon vapors are scrubbed with a scrubbing menstruum, for instance, water, introduced through line 33, for recovery of the valuable hydrocarbons. The scrubbed gases pass out through conduit 34 and the scrubbing menstruum and absorbed hydrocarbons pass through line 35 to a separator, diagrammatically represented at 36, from which the menstruum and heavier hydrocarbons pass through line 37 and the lighter hydrocarbons pass off through line 38. The hydrocarbons may be separated and returned to the system for retreatment or passed to storage.

As in the reactor, a gaseous medium is introduced into the J-tubes of the stripping section and regenerating section, respectively, through lines 5 and 6 to assist in the stripping and regenerating of the catalyst and to maintain the catalyst in a fluidized state. In the stripping section of the regenerator, the gaseous medium introduced into lines 5 and 6 of the J-tubes may be steam or other stripping medium and that introduced into the J-tubes of the regenerating section is, with advantage, air.

It will be understood that the invention is not restricted with respect to the number of zones in the reactor or in the stripping or regenerating section of the regenerator. It is usually desirable, however, that no less than three zones be employed in each instance. A greater number may be used where desired and is usually desirable particularly in the reactor and in the regenerating section of the regenerator.

The catalyst employed may be of the type conventionally used in fluid catalyst processes, for instance, a silica-alumina type catalyst in finely divided or powdered form. The reaction conditions may likewise be those conventionally used in operations of this type and, as understood in the art, the optimum temperatures and pressures will depend primarily upon the type of stock used, the particular catalyst employed, and the reaction desired.

In cracking gas oil for instance, the reaction temperature may, with advantage, be within the range of about 800° to 1,000° F. and the pressure at the top of the reactor within the range of about 5 to 25 pounds per square inch. The regeneration temperature may be within the range of 950° to 1,200° F. and conventional means may be provided for preventing excess temperature rise in the regenerating section. The flue gases passing from the top of the regenerating section will usually be under super-atmospheric pressure of about five pounds per square inch and this pressure is, with advantage, boosted to, say, 25 pounds by the booster 28.

It will be understood that the present invention is not restricted to the particular embodiment herein described but is applicable to various modifications of fluid catalyst processes.

I claim:

1. In a fluid catalyst process for the conversion of hydrocarbons in which the catalyst is brought into intimate contact with hydrocarbon vapors in a reaction zone, spent catalyst is withdrawn from the reaction zone, stripped of hydrocarbons by intimate contact with a gaseous stripping medium and the stripped catalyst is decarbonized by contact with air, an improved method of effecting the stripping and regenerating of the catalyst which comprises passing catalyst directly from the reaction zone into the upper end of a vertically elongated chamber, introducing air into the lower portion of the chamber and passing it upwardly therethrough, passing the catalyst in a relatively dense fluidized phase generally downwardly through the chamber over a path including a plurality of passes transverse to, and in contact with, gases rising upwardly through the chamber, the respective dense phase transversely moving bodies of catalyst being surmounted by a dispersed phase catalyst suspension, and a downwardly projecting confined passageway connecting the lower portion of the respective transversely moving dense phase bodies of catalyst except the lowermost with the zone of dispersed phase catalyst surmounting the next lower transversely moving body of catalyst, said downwardly projecting passageways being upturned at their lower ends, so controlling the proportion of air to catalyst that the oxygen of the air is substantially completely consumed by combustion of the carbonaceous deposit on the catalyst, before coming in contact with the entering catalyst, whereby the entering catalyst is stripped of vaporizable hydrocarbons by contact with hot gaseous products of combustion substantially free from oxygen and withdrawing the products of combustion together with stripped hydrocarbons from an upper zone of the chamber.

2. In a fluid catalyst process for the conversion of hydrocarbons in which the catalyst is brought into intimate contact with hydrocarbon vapors in a reaction zone, spent catalyst is withdrawn from the reaction zone, stripped of hydrocarbons by intimate contact with a gaseous stripping medium and the stripped catalyst is decarbonized by contact with air, an improved method of effecting the stripping and regenerating of the catalyst which comprises, passing the catalyst directly from the reaction zone into the upper end of a vertically elongated chamber comprising a lower regenerating section and an upper stripping section opening at its lower end into the upper end of the regenerating section, introducing air into the lower portion of the chamber and passing it upwardly therethrough, passing the catalyst in a relatively dense fluidized phase generally downwardly through the stripping section and then downwardly through the regenerating section over a path in each including a plurality of passes transverse to, and in contact with, gases rising upwardly through the chamber, the respective dense phase transversely moving bodies of catalyst being surmounted by a dispersed phase catalyst suspension, and a downwardly projecting confined passageway connecting the lower portion of the respective transversely moving dense phase bodies of catalyst except the lowermost with the zone of dispersed phase catalyst surmounting the next lower transversely moving body of catalyst, said downwardly projecting passageways being upturned at their lower ends, so controlling the flow of air and catalyst through the regenerating section that the oxygen of the air is substantially completely consumed by combustion of the carbonaceous deposit on the catalyst upon reaching the upper end thereof, withdrawing a portion of the products of combustion from the upper end of the regenerating section, passing a further portion of the products of combustion, substantially free from oxygen, upwardly through the stripping section in contact with the catalyst, and thereby stripping hydrocarbons from the catalyst, so controlling the flow of catalyst and products of combustion through the stripping section that the catalyst is substantially completely stripped of vaporizable hydrocarbons before passing to the regenerating section, withdrawing regenerated catalyst from the lower end of the regenerating section, and returning it to the reaction zone, withdrawing products of combustion and stripped hydrocarbons from the upper end of the stripping section and separating the hydrocarbons from the products of combustion.

MARION J. WILCOX.

REFERENCES CITED

The following references are of record in the file of this patent:

UNITED STATES PATENTS

| Number | Name | Date |
|---|---|---|
| 2,367,281 | Johnson | Jan. 16, 1945 |
| 2,378,342 | Voorhees et al. | June 12, 1945 |
| 2,432,298 | Eastwood et al. | Dec. 9, 1947 |